United States Patent
Kakehi et al.

(10) Patent No.: US 11,725,733 B2
(45) Date of Patent: Aug. 15, 2023

(54) SEAL RING

(71) Applicant: NTN CORPORATION, Osaka (JP)

(72) Inventors: Kohzoh Kakehi, Mie (JP); Yuuki Yamazoe, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/982,573

(22) PCT Filed: Mar. 19, 2019

(86) PCT No.: PCT/JP2019/011404
§ 371 (c)(1),
(2) Date: Sep. 20, 2020

(87) PCT Pub. No.: WO2019/181922
PCT Pub. Date: Sep. 26, 2019

(65) Prior Publication Data
US 2021/0018097 A1 Jan. 21, 2021

(30) Foreign Application Priority Data
Mar. 22, 2018 (JP) .................................. 2018-055092

(51) Int. Cl.
*F16J 15/16* (2006.01)

(52) U.S. Cl.
CPC ..................... *F16J 15/16* (2013.01)

(58) Field of Classification Search
CPC ......... F16J 15/16; F16J 15/3272; F16K 1/226
See application file for complete search history.

(56) References Cited

U.S. PATENT DOCUMENTS

| 3,784,215 A | 1/1974 | Ruthenberg |
| 2018/0100586 A1* | 4/2018 | Ishigaki ................. F02M 26/70 |

FOREIGN PATENT DOCUMENTS

| CN | 2397271 Y | 9/2000 |
| JP | 48-072548 A | 9/1973 |

(Continued)

OTHER PUBLICATIONS

Machine translation of JP 2009-085391A dated Apr. 23, 2009.
(Continued)

*Primary Examiner* — Gilbert Y Lee
(74) *Attorney, Agent, or Firm* — Hedman & Costigan, P.C.; James V. Costigan; Kathleen A. Costigan (57) ABSTRACT

To provide a seal ring capable of suppressing wear of a mating housing and preventing protrusion from an annular groove and thereby being superior in low leak performance, which is an original object of the seal ring. A seal ring 1 formed of resin is attached to an annular groove 12 formed on an outer periphery of a butterfly valve 11 having a substantially disc shape so as to seal an annular gap 14 between the butterfly valve 11 and a housing 13 in which the valve is housed. A part of the seal ring 1 is protruded from the annular groove 12, so that the seal ring 1 adheres to the housing 13 to seal the annular gap 14 due to pressure from sealed fluid. A radial direction thickness t of the ring is set in a range of 7-11% of a ring outer diameter in a free state. A ring inner diameter in a state in which the diameter is enlarged due to pressure from the sealed fluid when the valve is opened, is smaller than an outer diameter r of the valve.

12 Claims, 7 Drawing Sheets

(56) References Cited

FOREIGN PATENT DOCUMENTS

| | | | |
|---|---|---|---|
| JP | 2009-085391 A | 4/2009 | |
| JP | 2013-241899 A | 12/2013 | |
| JP | 2017-180726 A | 10/2017 | |
| JP | 2017180726 A * | 10/2017 | ........... F16J 15/3272 |
| JP | 2020012507 A * | 1/2020 | ........... F16K 1/2261 |
| WO | 2017/169535 A1 | 3/2017 | |

OTHER PUBLICATIONS

Machine translation of the claims of Jp 48-072548A dated Sep. 29, 1973. This patent is equivalent to U.S. Pat. No. 3,784,215.
Machine translation of JP 2013-241899A dated Dec. 5, 2013.
Machine translation of JP 2017-180726A dated Oct. 5, 2017.
English abstract of CN2397271Y dated Sep. 20, 2000.
Machine translation of CN2397271Y dated Sep. 20, 2000.

* cited by examiner

SEAL RING

TECHNICAL FIELD

The present invention relates to a seal ring for sealing (sealing) fluid in a device using the fluid such as exhaust gas and hydraulic oil.

BACKGROUND ART

An exhaust gas recirculation (EGR) system of an internal combustion engine returns a part of exhaust gas into an intake system to suppress a maximum temperature of mixture in combusting to be low, so that a generation amount of NOx is suppressed. An EGR valve is a butterfly valve rotatably arranged in an EGR passage (housing). An opening of the valve is adjusted to control an amount of the exhaust gas to be recirculated. An annular groove is formed on an outer periphery of the EGR valve having a substantially disc shape, and a seal ring is attached to the annular groove.

Figure 7:
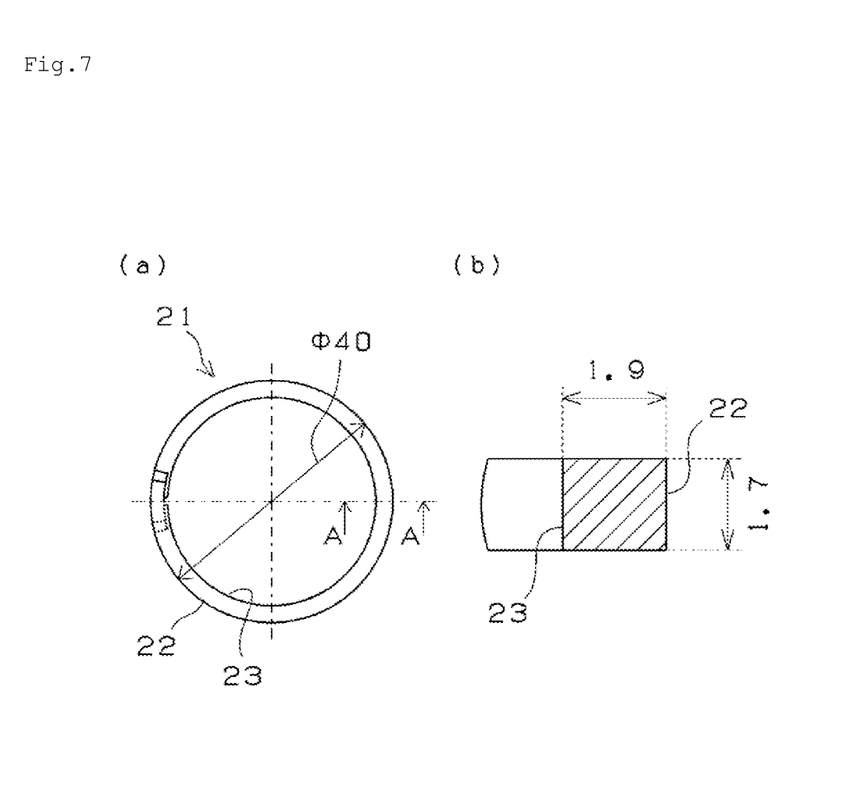
FIGS. 7(a) and 7(b) area plane view and a cross-sectional view taken along line A-A of a conventional seal ring.

Conventionally, a metal seal ring and a resin seal ring have been proposed as a seal ring (see Patent Document 1). FIGS. 7(a) and 7(b) show a plane view and a cross-sectional view taken along line A-A of a conventional seal ring (conventional product). As shown in FIGS. 7(a) and 7(b), a seal ring 21 is a ring-like member having a substantially rectangular section. The seal ring 21 has an abutment at one position in a circumferential direction. In a state in which the seal ring 21 is attached to the annular groove of the EGR valve, a ring outer peripheral surface 22 is pushed onto an inner wall of the housing, so that an annular gap between the valve and the housing is sealed.

PRIOR ART DOCUMENT

Patent Document

Patent Document 1: JP 2013-241899 A

SUMMERY OF THE INVENTION

Problems to be Solved by the Invention

In recent years, high function and low energy consumption of industrial devices have been progressed, and therefore a design with high accuracy for various components and durability thereof are desired. Also, a seal ring of which each property is improved while maintaining superior sealing performance is desired. In this respect, the conventional metal seal ring might cause damage on a housing served as a mating member, or might promote wear of the housing.

While, in the resin seal ring, wear of the mating housing is relatively superior. However, the bending elastic modulus of the resin seal ring is inferior compared to the metal seal ring, and therefore the seal ring is protruded from the annular groove even in a lower pressure when the EGR valve is opened, and accordingly the seal ring might be bitten between the valve and the mating housing. Further, when the EGR valve is closed, the pressure of approximately 40 kPa is applied to the seal ring, so that the abutment might be opened due to the pressure when the EGR valve is opened and thereby the seal ring might be dropped off from the EGR valve.

For example, in the conventional seal ring 21 (ring outer diameter of ϕ40 mm, radial direction thickness of 1.9 mm, and ring width of 1.7 mm) shown in FIGS. 7(a) and 7(b), the seal ring might be enlarged in diameter due to the pressure applied thereto and thereby the seal ring might be protruded from the annular groove.

An object of the present invention is, in order to solve such problems, to provide a seal ring capable of suppressing wear of a mating housing and preventing protrusion thereof from an annular groove and thereby being superior in low leak performance, which is an original object of the seal ring.

Means for Solving the Problems

A seal ring of the present invention is formed of resin to be attached to an annular groove formed on an outer periphery of a butterfly valve having a substantially disc shape to seal a gap between the valve and a housing in which the valve is housed. A part of the seal ring is protruded from the annular groove when the valve is closed, so that the seal ring adheres to the housing to seal the gap due to pressure from sealed fluid. A radial direction thickness of the ring is set in a range of 7-11% of a ring outer diameter in a free state. A ring inner diameter in a state in which the diameter is enlarged due to pressure from the sealed fluid when the valve is opened, is smaller than an outer diameter of the valve.

The seal ring may include a thickness reduction part of which the radial direction thickness of the ring is reduced, on at least a part of a ring inner diametrical surface of the seal ring. An abutment of the seal ring may be formed as a composite step shaped abutment.

The resin forming the seal ring may be a polyether ether ketone (PEEK) resin, a polyamide imide (PAI) resin, or a polyphenylene sulfide (PPS) resin.

The butterfly valve may be used as a control valve of an exhaust gas recirculation system of an internal combustion engine.

Effect of the Invention

In the seal ring of the present invention, a part of the seal ring is protruded from the annular groove to adhere to the housing, so that the seal ring seals the gap due to pressure from sealed fluid, and the radial direction thickness of the ring is set in a range of 7-11% of the ring outer diameter in the free state. Since the radial direction thickness of the ring is larger than that of a conventional product, in a case in which the pressure of, for example, 40 kPa or more is generated, the seal ring can be suppressed to be excessively expanded. Further, the ring inner diameter in a state in which the diameter is enlarged due to pressure from the sealed fluid when the valve is opened, is smaller than the outer diameter of the valve. Thus, the seal ring can be prevented from being dropped off from the annular groove even in a diameter enlarged state when the valve is opened.

The seal ring includes the thickness reduction part of which the radial direction thickness of the ring is reduced, on at least a part of the ring inner diametrical surface of the seal ring. Thus, for example, even in a case in which the radial direction thickness of the ring is made larger than that of the conventional seal ring, assembling performance of the seal ring to the annular groove can be secured, and a crack of the seal ring can be prevented.

The abutment of the seal ring is formed as a composite step shaped abutment. Thus, superior sealing performance can be obtained in a configuration that allows the diameter to be enlarged.

The resin forming the seal ring is a PEEK resin, a PAI resin, or a PPS resin. Thus, the seal ring is superior in wear resistance, sealing performance, heat resistance, and durability. Further, since superior bending elastic modulus can be obtained, the seal ring is not cracked when the diameter thereof is enlarged in assembling the seal ring into the annular groove.

When an EGR valve is closed in an EGR system, the pressure of 40 kPa at maximum is applied to the valve. However, since the seal ring is used for a control valve of the EGR system, even in a case in which the pressure of 40 kPa at maximum is applied to the seal ring, the seal ring can be prevented from being dropped off from the valve.

MODE FOR CARRYING OUT THE INVENTION

Figure 1:
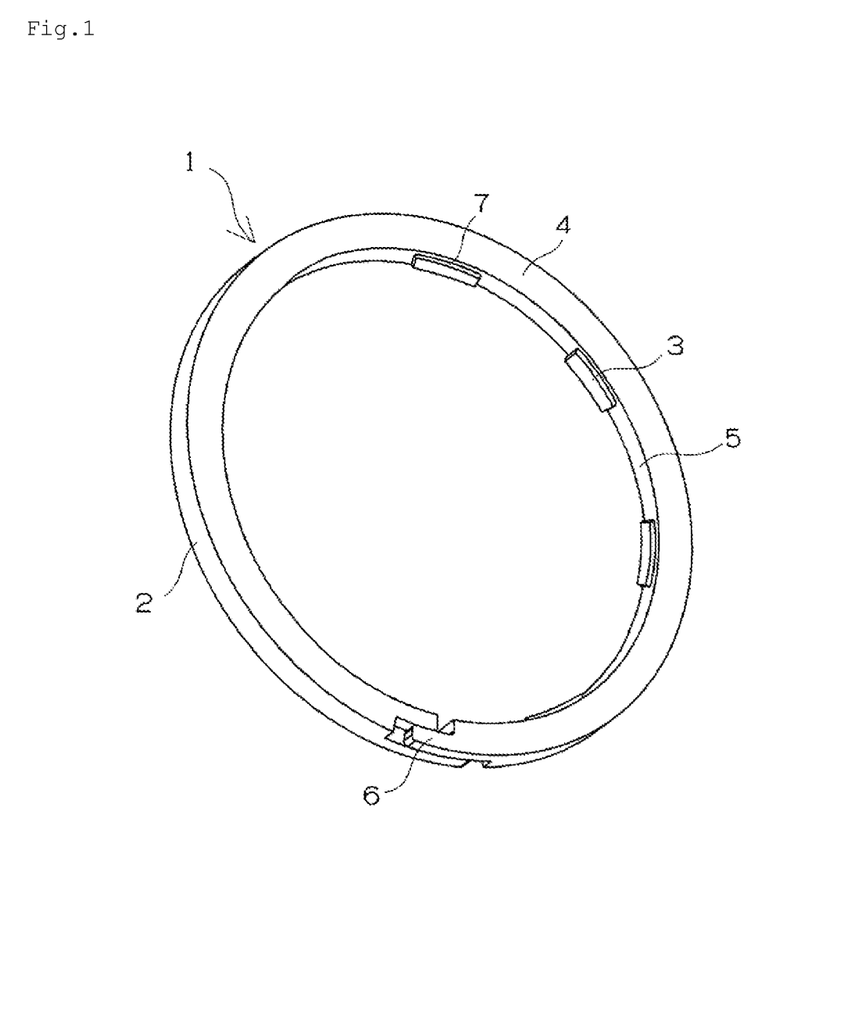
FIG. 1 is a perspective view illustrating one example of a seal ring of the present invention.
Figure 2:
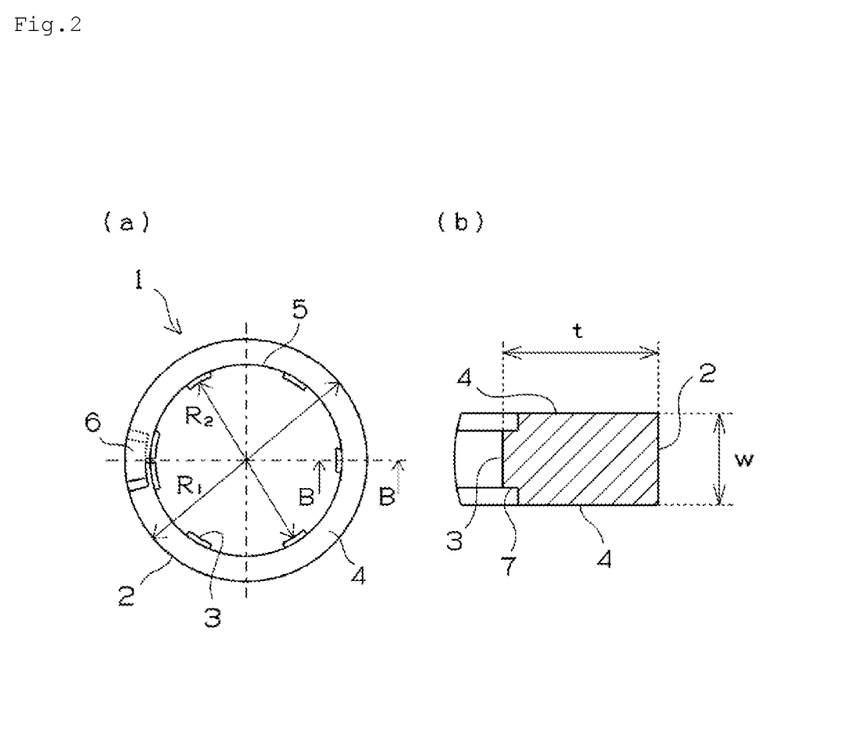
FIGS. 2(a) and 2(b) area plane view and a cross-sectional view taken along line B-B of the seal ring shown in FIG. 1.
Figure 3:
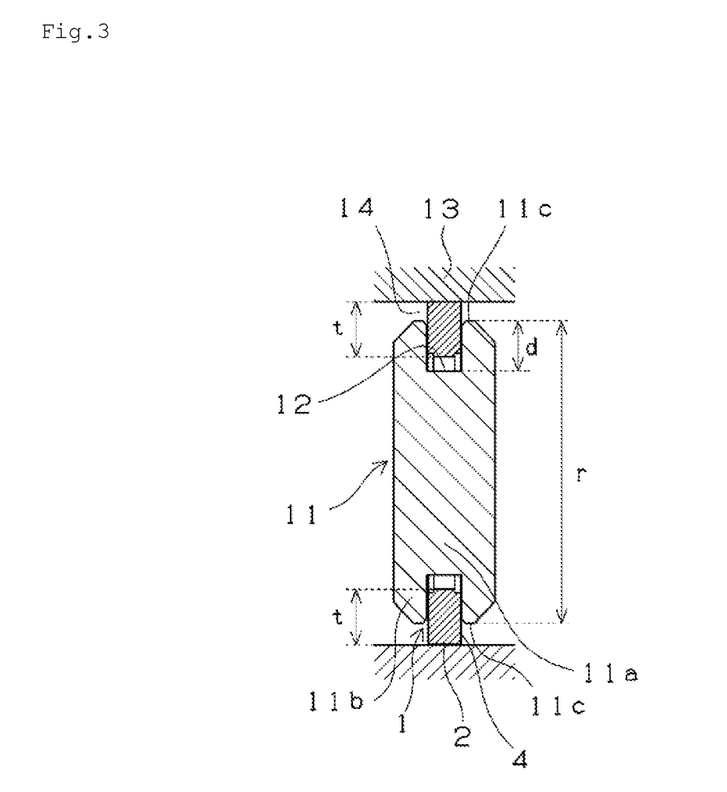
FIG. 3 illustrates a state of the seal ring shown in FIG. 1 when a valve is closed.

One example of a seal ring of the present invention will be described with reference to FIG. 1 through FIG. 3. FIG. 1 is a perspective view of a seal ring. FIGS. 2(a) and 2(b) are a plane view and a cross-sectional view taken along line B-B of the seal ring shown in FIG. 1. FIG. 3 illustrates a state of the seal ring shown in FIG. 1 when a valve is closed. The seal ring of the present invention is used for a control valve using a butterfly valve. The seal ring is a seal member to be attached to an annular groove formed on an outer periphery of the butterfly valve having a substantially disc shape so as to seal a gap between the valve and a housing in which the valve is housed. The control valve is opened or closed when the butterfly valve having a substantially disc shape is rotated in the housing around an axis of a valve shaft. Example of this type of the control valve includes a control valve for an exhaust gas recirculation (EGR) system of an internal combustion engine (also called merely "EGR control valve").

As shown in FIG. 1, a seal ring 1 is a molded body of a resin composition. The seal ring 1 is formed in a ring-like member having a substantially rectangular section. A ring outer peripheral surface 2 and a ring inner peripheral surface 3 are parallel to an axial direction of the seal ring 1. Each corner between the ring inner peripheral surface 3 and a ring side surface 4 (both side surfaces) may be formed in a linear manner or may have a chamfer formed in a curved manner. Or alternatively, in a case in which the seal ring is formed by injection molding, a stepped part 7 served as a protruded part protruded from a molding die may be formed on the corner. A plurality of thickness reduction parts 5 (six parts in FIG. 2(a)) of which a ring radial direction thickness is reduced is formed on the ring inner peripheral surface 3. The thickness reduction parts 5 are formed to be separated from each other along a circumferential direction. In this case, the thickness reduction parts 5 are formed on the stepped part 7 forming the ring inner peripheral surface 3 so as to be separated from each other along the circumferential direction.

The seal ring 1 is formed as a cut-type ring having an abutment 6 at one position. The seal ring 1 is enlarged in diameter due to its elastic deformation and then attached to an annular groove of the butterfly valve. The seal ring 1 is formed to have a diameter slightly larger than that of a seal surface (inner wall of the housing) in a free state in which outer force is not applied thereto. The seal ring 1 is formed to adhere to the seal surface due to the pressure from sealed fluid when the valve is closed. A shape of the abutment 6 may be a straight cut shape or an angle cut shape, however a composite step cut shape as shown in FIG. 1 is preferable because of its superior sealing performance with respect to the sealed fluid.

The seal ring 1 shown in FIG. 2(a) shows a free state of the seal ring. In the present invention, in the free state, a ring outer diameter is defined as $R_1$, and a ring inner diameter is defined as $R_2$. The ring inner diameter $R_2$ is a distance between the ring inner peripheral surfaces 3 facing each other. Further, as shown in FIG. 2(b), a ring radial direction thickness t is a distance between the ring outer peripheral surface 2 and the ring inner peripheral surface 3. A ring width w is a distance between one ring side surface 4 and the other ring side surface 4 in the axial direction. In the seal ring 1, a relation of $R_1=R_2+2t$ is fulfilled. As described below, in the present invention, the ring radial direction thickness t is defined against the outer diameter $R_1$.

The ring width w of the seal ring 1 is not especially limited, however it is preferably set in a range of 0.7-2.5 mm. In a case in which the ring width w is smaller than 0.7 mm, the sealing performance might be deteriorated. While, in a case in which the ring width w is larger than 2.5 mm, the butterfly valve is needed to be thicker, and thereby downsizing of a valve apparatus is difficult.

As shown in FIG. 3, the seal ring 1 is attached to an annular groove 12 formed on an outer periphery of a butterfly valve 11 having a substantially disc shape so as to seal an annular gap 14 between the butterfly valve 11 and a housing 13. The butterfly valve 11 is formed by an annular groove forming part 11a, and a valve body 11b at both sides thereof in the axial direction. A diameter of an outer diametrical surface 11c of the valve body 11b is a maximum outer diameter of the butterfly valve 11. In the present invention, the maximum outer diameter is defined as an outer diameter r of the butterfly valve 11. Further, a depth d of the annular groove 12 is a distance between the outer diametrical surface 11c and a groove bottom. The depth d is uniform in a whole circumference.

The butterfly valve 11 is supported by a shaft (not shown) served as a valve shaft and housed rotatably in the housing 13. When the butterfly valve 11 is rotated in the housing 13, the valve is opened or closed. A part of the seal ring 1 at an outer diameter side is protruded from the annular groove 12 due to pressure of approximately 40 kPa at maximum applied to the seal ring 1 from the EGR gas served as sealed fluid and due to tensile force thereof in a diameter enlarging direction, and thereby the ring outer peripheral surface 2 is pressed to adhere to the inner wall of the housing 13.

Further, the seal ring 1 is attached movably in the radial direction, the axial direction and the circumferential direction within the annular groove 12. A clearance is slightly formed also in the axial direction. When the valve is closed, in addition to the ring outer peripheral surface 2 described above, the ring side surface 4 of the seal ring 1 is pressed to adhere to a side wall of the annular groove 12 at a non-sealed side, so that the annular gap 14 is sealed.

In this way, the seal ring that prevents the EGR gas from leaking when the valve is closed is arranged in the EGR control valve. The EGR gas passing the EGR control valve includes solid fine foreign particles, and therefore, in a case in which the foreign particles are accumulated at a certain area in the annular groove 12, the seal ring might be difficult to move within the annular groove or the seal ring might be prevented from returning from a diameter enlarged state into the free state. Accordingly, a predetermined gap is formed between an inner diameter part of the seal ring and the groove bottom. The gap is set to secure a sufficiently gap for the seal ring even when the valve is fully opened.

When the valve is opened from a closed state, the seal ring 1 is released from the binding by the housing 13, and thereby the abutment 6 is separated by the pressure from the sealed fluid described above to enlarge the diameter of the seal ring 1. In this case, it is necessary that the ring inner peripheral surface of the seal ring of which the diameter is enlarged is not protruded from the annular groove 12. As a measure for this, it may be considered that the radial direction thickness of the seal ring is made large. However, in a case in which the thickness is made large, a maximum inner diameter to be enlarged is made small, and therefore the seal ring might not be assembled into the annular groove 12 of the butterfly valve 11 depending on its thickness. That is, it is necessary that the seal ring secures both of protrusion prevention performance from the annular groove and assembling performance to the annular groove. In the seal ring of the present invention, considering such configurations, the thickness thereof is set in a predetermined range thicker than that of the conventional product.

The radial direction thickness t of the seal ring 1 is set in a range of 7-11% of the ring outer diameter $R_1$ in a free state. That is, in a case in which the ring outer diameter $R_1$ in the free state is ϕ40 mm, the radial direction thickness t is set in a range of 2.8-4.4 mm. In a case in which the ring outer diameter $R_1$ in the free state is ϕ35 mm, the radial direction thickness t is set in a range of 2.45-3.85 mm. In a case in which the radial direction thickness t is smaller than 7% of the ring outer diameter $R_1$, the seal ring might be protruded from the annular groove. While, in a case in which the radial direction thickness t is larger than 11% of the ring outer diameter $R_1$, the seal ring might be cracked in assembling into the annular groove. More preferably, the radial direction thickness t of the seal ring is set in a range of 8-10% of the ring outer diameter $R_1$ in the free state. The ring outer diameter $R_1$ in the free state of the seal ring 1 of the present invention may be set in any size.

Figure 4:
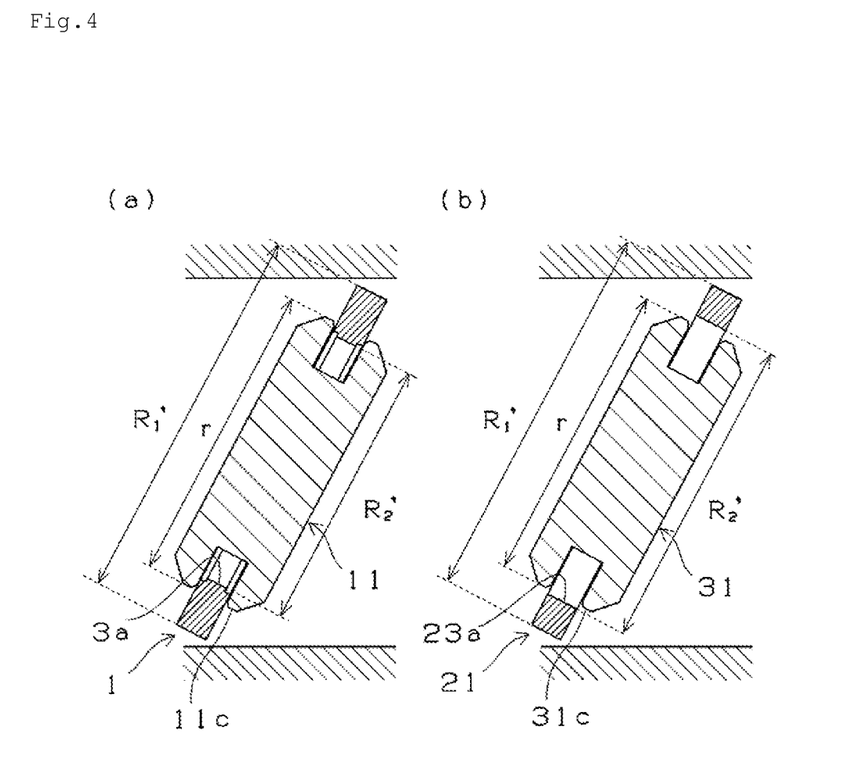
FIGS. 4(a) and 4(b) illustrate a state of the seal ring or the like shown in FIG. 1 when the valve is opened.

In the seal ring of the present invention, in addition to the setting of the radial direction thickness t, the ring inner diameter in a state in which the diameter is enlarged and the valve size fulfill a predetermined relation, so that superior protrusion prevention performance of the seal ring can be obtained. The protrusion performance of the seal ring when the valve is opened from the closed state is described with reference to FIGS. 4(a) and 4(b). FIG. 4(a) illustrates a state of the seal ring of the present invention when the valve is opened. FIG. 4(b) illustrates a state of the conventional product when the valve is opened. Each of the seal rings shown in FIGS. 4(a) and 4(b) is enlarged in diameter when the valve is opened. A ring outer diameter in a state in which the diameter is enlarged is defined as $R_1'$, and a ring inner diameter in a state in which the diameter is enlarged is defined as $R_2'$. In a state in which the diameter is enlarged, a relation of $R_1'=R_2'+2t$ is fulfilled. As shown in FIGS. 4(a) and 4(b), as to the radial direction thickness of the seal ring, the radial direction thickness of the seal ring 1 is larger than the radial direction thickness of the seal ring 21.

In the conventional product shown in FIG. 4(b), a ring inner peripheral surface 23a is located at an outer side in the radial direction with respect to an outer diametrical surface 31c of a butterfly valve 31, and therefore the seal ring 21 might be protruded from the annular groove. That is, a clearance might be generated between the ring inner peripheral surface 23a and the outer diametrical surface 31c. In this case, the ring inner diameter $R_2'$ in a state in which the diameter is enlarged is larger than the outer diameter r of the valve ($R_2'>r$).

Against this, in the seal ring 1 of the present invention shown in FIG. 4(a), the ring inner diameter $R_2'$ in a state in which the diameter is enlarged is smaller than the outer diameter r of the valve ($R_2'<r$). Thus, the ring inner peripheral surface 3a is located at an inner side in the radial direction with respect to the outer diametrical surface 11c of the butterfly valve 11, namely located in the annular groove, and thereby the seal ring 1 can be prevented from being protruded from the annular groove.

Figure 5:
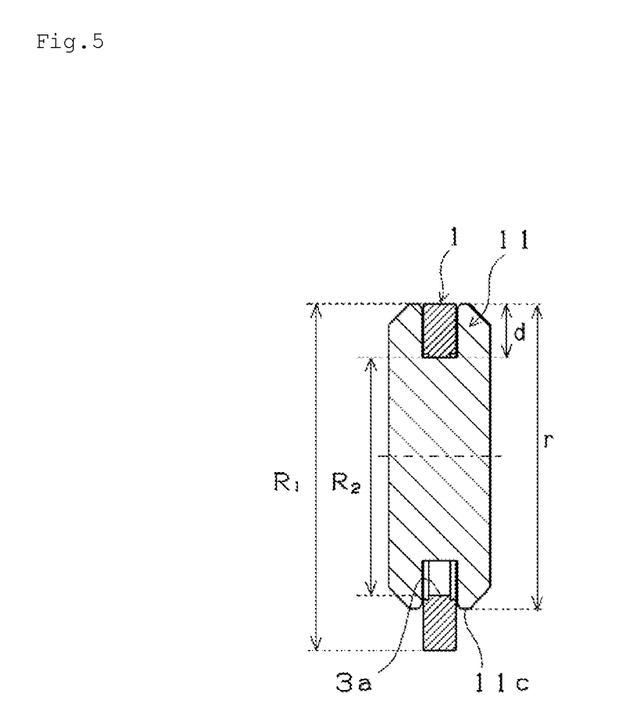
FIG. 5 illustrates a state of the seal ring shown in FIG. 1 dropped into an annular groove.

The pressurizing is cancelled after a while since valve is opened, and the seal ring of which the diameter has been enlarged is returned into the free state. FIG. 5 illustrates a state of the seal ring against the butterfly valve 11 at this time. As shown in FIG. 5, the seal ring after the pressurizing is cancelled is dropped into the groove bottom of the annular groove, and the ring inner peripheral surface 3a at a side facing the bottom groove is apt to be located at the outer side in the radial direction with respect to the outer diametrical surface 11c of the butterfly valve 11. In the seal ring of the present invention, the ring inner diameter $R_2$ in the free state is smaller than a value (r–d) for which a depth d of the annular groove is subtract from the outer diameter r of the valve ($R_2<r-d$), so that the seal ring 1 is remained in the annular groove and therefore the seal ring can be prevented from being protruded from the annular groove even after the pressurizing is cancelled.

The seal ring of the present invention is a molded body of a resin composition as described above. Examples of the synthetic resin to be used include: a fluororesin such as a thermosetting polyimide resin, a thermoplastic polyimide resin, a polyether ketone ether ketone ketone (PEKEKK) resin, a polyether ketone (PEK) resin, a PEEK resin, a wholly aromatic polyester resin, and a polytetrafluoroethylene (PTFE) resin; a PPS resin; a PAI resin; and a polyamide (PA) resin. Further, these synthetic resins may be adopted independently or may be adopted as a polymer alloy in which two or more kinds of the synthetic resins are mixed.

It is preferable that the seal ring is formed as a injection molded body by injection-molding the synthetic resin because the seal ring having the abutment with a composite step cut shape or the like can be easily manufactured at a low cost. Thus, the thermoplastic resins that can be injection molded are preferably adopted as the synthetic resin. Of these thermoplastic resins, the PEEK resin, the PAI resin, or the PPS resin is preferably adopted because it is superior in wear resistance, sealing performance, heat resistance, durability, and bending elastic modulus.

Further, a fiber reinforcing material such as carbon fiber, glass fiber, and aramid fiber; a spherical filler such as spherical silica and spherical carbon; a scaly reinforcing material such as mica and talc; and a fine fiber reinforcing material such as calcium titanate whisker may be compounded as needed into the synthetic resin described above. Further, a solid lubrication agent such as PTFE resin, graphite, and molybdenum disulfide; a sliding reinforcing material such as calcium phosphate, and calcium sulfate; and carbon black may be compounded into the synthetic resin described above. One of them may be utilized, or alternatively two or more of them may be utilized together. In particular, the PEEK resin, the PAI resin or the PPS resin containing the carbon fiber as a fiber reinforcing material, and the PTFE resin as a solid lubrication agent is preferable because the characteristics required for the seal ring of the present invention is easily obtained. The mechanical strength such as bending elastic modulus can be improved by compounding the carbon fiber, and the sliding performance can be improved by compounding the PTFE resin.

Figure 6:
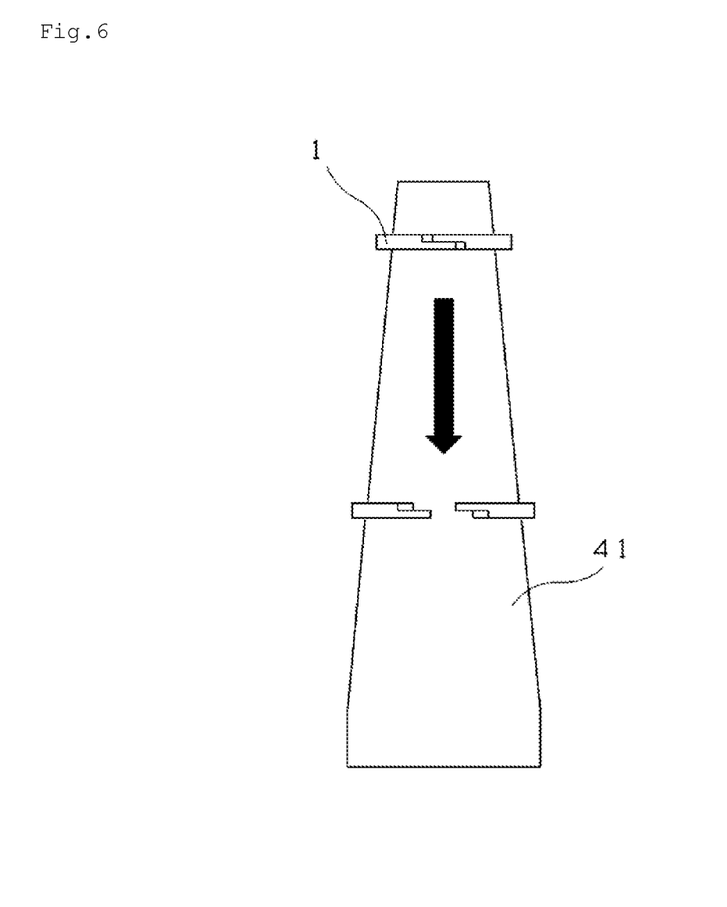
FIG. 6 illustrates a method for enlarging a diameter of the seal ring.

As described above, in the seal ring of the present invention, it is necessary to secure both of the protrusion prevention performance and the assembling performance, and the bending elastic modulus thereof is preferably set in a range of 5,000-12,000 MPa, and more preferably set in a range of 6,000-9,000 MPa. For example, as shown in FIG. 6, the seal ring 1 is attached to the annular groove of the valve in a state in which the diameter thereof is enlarged using a jig, and therefore in a case in which the bending elastic modulus is more than 12,000 MPa, the seal ring might be cracked by enlarging the diameter when attached to the annular groove. While, in a case in which the bending elastic modulus is less than 5,000 MPa, the diameter is excessively enlarged due to the pressure applied to the seal ring 1, and thereby the seal ring might be protruded from the annular groove.

In a case in which the seal ring is formed as an injection molded body, the above raw materials are melt-kneaded to obtain molding pellets. And then, the pellets are molded into a predetermine shape using a known injection-molding method. A position of a gate for the injection-molding is not especially limited, however the gate is preferably arranged at a side of the ring inner peripheral surface from a viewpoint of securing sealing performance and eliminating the need for afterward processing.

The butterfly valve of the present invention includes the seal ring described above in the annular groove, and therefore the butterfly valve can be stably utilized while preventing the seal ring from dropping off even when the valve is opened. In particular, the butterfly valve is preferably utilized as the EGR valve in which pressure of approximately 40 kPa at maximum is applied.

The valve apparatus of the present invention includes the seal ring of the present invention and the butterfly valve having a substantially disc shape to which the seal ring is attached, and the butterfly valve is rotatably arranged in the housing. An amount of the sealed fluid such as exhaust gas is controlled by adjusting the opening of the valve.

A seal structure of the present invention includes the seal ring described above, the butterfly valve having a substantially disc shape to which the seal ring is attached, and a housing (fluid passage) in which the butterfly valve is housed.

EXAMPLE

An outer diameter ratio (6-12%) of the radial direction thickness t to the ring outer diameter $R_1$ is examined using the seal ring having the shape shown in FIG. 1 and FIGS. 2(a) and 2(b) in a viewpoint of the protrusion prevention performance and the assembling performance. The seal ring having the ring outer diameter $R_1$ of ϕ40 mm (see Table 1) and the seal ring having the outer diameter $R_1$ of ϕ35 mm (see Table 2) are adopted. The seal ring having the outer diameter of ϕ40 mm is attached to the butterfly valve having the valve outer diameter r of ϕ39 mm, and the seal ring having the outer diameter of ϕ35 mm is attached to the butterfly valve having the valve outer diameter r of ϕ34 mm. The synthetic resin used for each seal ring is the PEEK resin. The bending elastic modulus (JIS K7171) of each seal ring is 7,800 MPa. The ring width w of each seal ring is 1.7 mm.

The values in the fields in Table 1 and Table 2 of the seal rings having different outer diameter ratios are obtained by the following way.

(1) the ring outer diameter of the seal ring protruded from the outer diametrical part of the butterfly valve is obtained from the bending elastic modulus of the seal ring and a size of each of parts in the seal ring and butterfly valve.

(2) the pressure is obtained when the outer diameter is enlarged until the seal ring is protruded from the outer diametrical part of the butterfly valve.

(3) the ring inner diameter when the seal ring is cracked (broken) is obtained by enlarging the diameter of the seal ring.

TABLE 1

|  | Examples | | | | | Comparative examples | |
| --- | --- | --- | --- | --- | --- | --- | --- |
|  | 1 | 2 | 3 | 4 | 5 | 1 | 2 |
| Seal ring outer diameter ratio (%) | 7 | 8 | 9 | 10 | 11 | 6 | 12 |
| Ring thickness (ϕ40 mm × outer diameter ratio) (mm) | 2.8 | 3.2 | 3.6 | 4 | 4.4 | 2.4 | 4.8 |
| Ring outer diameter when protruded from valve outer diametrical part (mm) | 41.4 | 41.8 | 42.2 | 42.6 | 43.0 | 41.0 | 43.3 |
| Pressure that enlarges outer diameter until protruded (kPa) *40 kPa or more is necessary | 56 | 123 | 239 | 432 | 739 | 22 | 1213 |
| Inner diameter when seal ring is broken (mm) (valve outer diameter ϕ39) *ϕ9 mm or more is necessary | 50.5 | 46.9 | 44.1 | 41.8 | 39.9 | 55.8 | 38.2 |

TABLE 2

|  | Examples | | | | | Comparative examples | |
| --- | --- | --- | --- | --- | --- | --- | --- |
|  | 6 | 7 | 8 | 9 | 10 | 3 | 4 |
| Seal ring outer diameter ratio (%) | 7 | 8 | 9 | 10 | 11 | 6 | 12 |
| Ring thickness (ϕ35 mm × outer diameter ratio) (mm) | 2.5 | 2.8 | 3.2 | 3.5 | 3.9 | 2.1 | 4.2 |
| Ring outer diameter when protruded from valve outer diametrical part (mm) | 36.1 | 36.4 | 36.7 | 37.1 | 37.4 | 35.7 | 37.8 |
| Pressure that enlarges outer diameter until protruded (kPa) *40 kPa or more is necessary | 46 | 104 | 209 | 386 | 670 | 16 | 1148 |
| Inner diameter when seal ring is broken (mm) (valve outer | 44.5 | 41.2 | 38.7 | 36.7 | 35.0 | 49.3 | 33.5 |

TABLE 2-continued

| | Examples | | | | | Comparative examples | |
|---|---|---|---|---|---|---|---|
| | 6 | 7 | 8 | 9 | 10 | 3 | 4 |
| diameter φ34) *φ34 mm or more is necessary | | | | | | | |

Relating to the protrusion prevention performance, since the pressure of 40 kPa at maximum is applied to the EGR valve, the pressure obtained in the item (2) described above is necessary to be 40 kPa or more. In each of the seal rings of Examples 1 to 5 and Examples 6 to 10, the pressure is more than 40 kPa, and therefore the seal ring is not protruded from the annular groove of the valve. In this case, the ring inner diameter enlarged by the pressure of 40 kPa is smaller than the outer diameter of the valve in each example. On the other hand, in the seal rings of Comparative examples 1 and 3 (outer diameter ratio is 6%), the pressures obtained in the item (2) described above are 22 kPa and 16 kPa, which are less than 40 kPa respectively, and therefore the seal ring might be protruded from the annular groove of the valve. That is, in a configuration in which the outer diameter ratio is less than 7%, the protrusion prevention performance of the seal ring is deteriorated.

Relating to the assembling performance, it is necessary to enlarge the seal ring larger than the outer diameter of the butterfly valve in assembling the seal ring into the valve. Thus, the ring inner diameter obtained in the item (3) described above is necessary to be 39 mm or more in Table 1, and 34 mm or more in Table 2. Each of the seal rings of Examples 1 to 5 and Examples 6 to 10 fulfills the above numerical range, so that each of the seal rings can be assembled to the valve without causing a crack. On the other hand, each of the seal rings of Comparative examples 2 and 4 (outer diameter ratio is 12%) does not fulfill the above numerical range, and therefore the seal ring might be cracked in assembling the seal ring into the annular groove. That is, in a configuration in which the outer diameter ratio is more than 11%, the assembling performance of the seal ring is deteriorated.

As described above, in the seal ring, by setting the ratio of the radial direction thickness of the ring to the ring outer diameter in a range of 7-11%, preferably in a range of 8-10%, both of the protrusion prevention performance and the assembling performance can be obtained.

INDUSTRIAL APPLICABILITY

The seal ring of the present invention can suppress the wear of the mating housing and prevent the protrusion thereof from the annular groove, and thereby the seal ring is superior in low leak performance, which is an original object of the seal ring. Consequently, the seal ring of the present invention can be widely adopted as a seal ring attached to an annular groove of a valve, in particular, the seal ring of the present invention can be preferably used as a seal ring for an EGR valve to which pressure of approximately 40 kPa is applied.

REFERENCE SIGNS LIST

1: seal ring
2: ring outer peripheral surface
3: ring inner peripheral surface
4: ring side surface
5: thickness reduction part
6: abutment
7: stepped part
11: butterfly valve
12: annular groove
13: housing
14: annular gap

The invention claimed is:

1. A seal ring for a butterfly valve, said seal ring being formed of resin, and being adapted to be attached to an annular groove formed on an outer periphery of a butterfly valve that is opened or closed, said butterfly valve being substantially disc shaped and rotatable around an axis of a valve shaft to seal a gap between the butterfly valve and a housing in which the butterfly valve is housed,
   said seal ring being formed, so that when said seal ring is in a free state and outer force is not applied to said seal ring, said seal ring will have a diameter larger than the diameter of an inner wall of the housing to which said seal ring will be attached,
   said seal ring having a radial direction thickness set in a range of 7-11% of an outer diameter of said seal ring when said seal ring is in a free state when outer force is not applied,
   wherein a part of the seal ring protrudes from the annular groove when the seal ring is attached to the annular groove and the housing, and the valve is closed, so that the seal ring adheres to the housing to seal the gap due to pressure from sealed fluid, and
   a ring inner diameter in a state in which the diameter is enlarged due to pressure from the sealed fluid when the valve is opened, is smaller than an outer diameter of the valve.

2. The seal ring according to claim 1, further comprising a thickness reduction part of which the radial direction thickness of the ring is reduced, on at least a part of a ring inner diametrical surface of the seal ring.

3. The seal ring according to claim 1, wherein an abutment of the seal ring is formed as a composite step shaped abutment.

4. The seal ring according to claim 1, wherein the resin forming the seal ring contains a polyether ether ketone resin, a polyamide imide resin, or a polyphenylene sulfide resin.

5. The seal ring according to claim 1, wherein the butterfly valve is used as a control valve of an exhaust gas recirculation system of an internal combustion engine.

6. The seal ring according to claim 1, wherein the ring outer diameter is in a free state in which outer force is not applied thereto is φ35 mm or more and φ40 mm or less.

7. A seal ring for a butterfly valve, said seal ring consisting of a resin composition and said seal ring is adapted to be attached to an annular groove formed on an outer periphery of a butterfly valve that is opened or closed, said butterfly valve being substantially disc shaped and rotatable around an axis of a valve shaft to seal a gap between the butterfly valve and a housing in which the butterfly valve is housed,
   said seal ring being formed, so that when said seal ring is in a free state and outer force is not applied to said seal ring, said seal ring will have a diameter larger than the diameter of an inner wall of said housing to which said seal ring will be attached,
   said seal ring having a radial direction thickness set in a range of 7-11% of an outer diameter of said seal ring when said seal ring is in a free state when outer force is not applied, wherein a part of the seal ring protrudes from the annular groove when the seal ring is attached to the annular groove and the housing, and the valve is closed, so that the seal ring adheres to the housing to seal the gap due to pressure from sealed fluid, and a ring inner diameter in a state in which the diameter is enlarged due to pressure from the sealed fluid when the valve is opened, is smaller than an outer diameter of the valve.

8. The seal ring according to claim 7, further comprising a thickness reduction part of which the radial direction thickness of the ring is reduced, on at least a part of a ring inner diametrical surface of the seal ring.

9. The seal ring according to claim 7, wherein an abutment of the seal ring is formed as a composite step shaped abutment.

10. The seal ring according to claim 7, wherein the resin composition forming the seal ring contains a polyether ether ketone resin, a polyamide imide resin, or a polyphenylene sulfide resin.

11. The seal ring according to claim 7, wherein the resin composition contains a fiber reinforcing material.

12. The seal ring according to claim 7, wherein the butterfly valve is used as a control valve of an exhaust gas recirculation system of an internal combustion engine.

* * * * *